(12) United States Patent
Hsu

(10) Patent No.: US 7,314,226 B2
(45) Date of Patent: Jan. 1, 2008

(54) FOLDING BICYCLE

(76) Inventor: Yu-Tu Hsu, No. 245, Guang-ming Rd., Da-Jea Village, Taichung County (TW)

( * ) Notice: Subject to any disclaimer, the term of this patent is extended or adjusted under 35 U.S.C. 154(b) by 55 days.

(21) Appl. No.: 11/194,005

(22) Filed: Jul. 28, 2005

(65) Prior Publication Data

US 2007/0024023 A1 Feb. 1, 2007

(51) Int. Cl.
*B62J 1/08* (2006.01)
*B62K 15/00* (2006.01)

(52) U.S. Cl. .................. 280/278; 280/287; 280/283
(58) Field of Classification Search ............. 280/278, 280/287, 283
See application file for complete search history.

(56) References Cited

U.S. PATENT DOCUMENTS

2005/0017479 A1* 1/2005 Liu ........................... 280/287

2005/0230933 A1* 10/2005 Woo .......................... 280/278

* cited by examiner

*Primary Examiner*—Kevin Hurley
(74) *Attorney, Agent, or Firm*—ProTechtor Int'l

(57) ABSTRACT

Provided is a folding bicycle comprising two auxiliary rear wheels at both sides of a rear wheel; a seat including a seat tube extended downward; a first crossbar having a front end pivotably connected to a lower portion of a handle above a front wheel, and a rear end fixedly connected to an intermediate portion of the seat tube; a pair of second crossbars having two front ends pivotably connected to an intermediate portion of the handle, and two rear ends fixedly connected to both ends of an hub of the rear wheel. The first crossbar passes an intermediate portion of the second crossbar and is pivotably connected thereto. A flexible shock absorbing means is provided at a joining portion of the seat tube and the second crossbars. The shock absorbing means is adapted to elastically deform when a downward force is exerted on the seat.

3 Claims, 5 Drawing Sheets

FOLDING BICYCLE

BACKGROUND OF THE INVENTION

1. Field of Invention

The present invention relates to folding bicycles and more particularly to such a folding bicycle with improved characteristics (e.g., shock absorbing device mounted under seat tube and two auxiliary rear wheels for increasing riding balance).

2. Related Art

A conventional folding bicycle is shown in FIGS. 1 and 2 and comprises a handle 80 including a pair of handlebars 81 on a top, and a front wheel 82 on a bottom; a seat 83 including a seat tube 831 extended downward; a first crossbar 84 having a front end pivotably connected to a lower portion of the handle 80 proximate the front wheel 82 and a rear end fixedly connected to an intermediate portion of the seat tube 831; and a pair of second crossbars 85 having two front ends pivotably connected to an intermediate portion of the handle 80 and two rear ends fixedly connected to both ends of an hub of a rear wheel 86 in which the first crossbar 84 passes an intermediate portion of the second crossbars 85 and is pivotably connected thereto.

There is a small distance between bottom of the seat tube 831 and the second crossbars 85. Thus, a portion of the first crossbar 84 proximate the joining point of itself and the seat tube 831 may deflect an angle $\theta$ when a person sits on the seat 83. The structural strength of the first crossbar 84 may decrease gradually as riding times increase. Thus, it is highly possible that the first crossbar 84 may break after a period time of use. Moreover, there is no support to either side of the bicycle. Thus, riding safety is not sufficient. This is particularly true for a young rider (e.g., child). Thus, the need for improvement still exists.

SUMMARY OF THE INVENTION

It is therefore an object of the present invention to provide a folding bicycle comprising a handle including a pair of handlebars on a top, and a front wheel on a bottom; a rear wheel including two auxiliary rear wheels at both sides, each of the auxiliary rear wheels being pivotably connected to a hub of the rear wheel through a link and being in rotating contact with the ground; a seat including a seat tube extended downward; a first crossbar having a front end pivotably connected to a lower portion of the handle above the front wheel, and a rear end fixedly connected to an intermediate portion of the seat tube; a pair of second crossbars having two front ends pivotably connected to an intermediate portion of the handle, and two rear ends fixedly connected to both ends of an hub of the rear wheel wherein the first crossbar passes an intermediate portion of the second crossbar and is pivotably connected thereto; and shock absorbing means provided at a joining portion of the seat tube and the second crossbars, the shock absorbing means being formed of a flexible material, wherein the shock absorbing means is adapted to elastically deform when a downward force is exerted on the seat. By utilizing this folding bicycle, the force of shocks and jarring while riding is much absorbed, a structural strength of the bicycle is maintained, and riding balance is improved.

In one aspect of the present invention, the shock absorbing means comprises a resilient member formed between itself and the second crossbars.

In another aspect of the present invention, the shock absorbing means comprises an upper cylindrical wall integrally formed therewith for surrounding a lower portion of the seat tube.

The above and other objects, features and advantages of the present invention will become apparent from the following detailed description taken with the accompanying drawings.

DETAILED DESCRIPTION OF THE INVENTION

Figure 1:
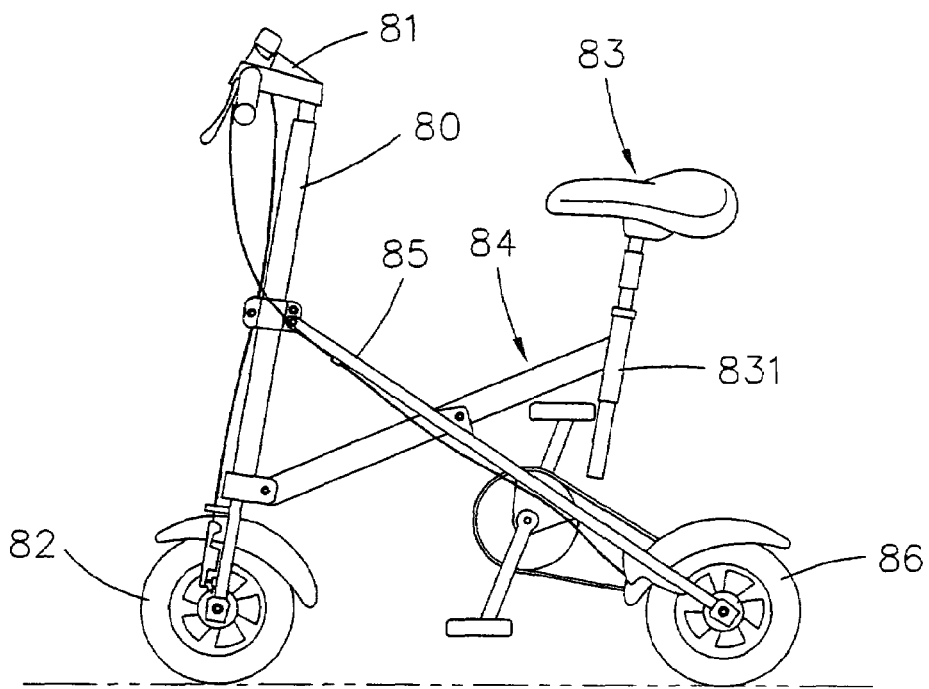
FIG. 1 is a side view of a conventional folding bicycle in its ready to ride state.
Figure 2:
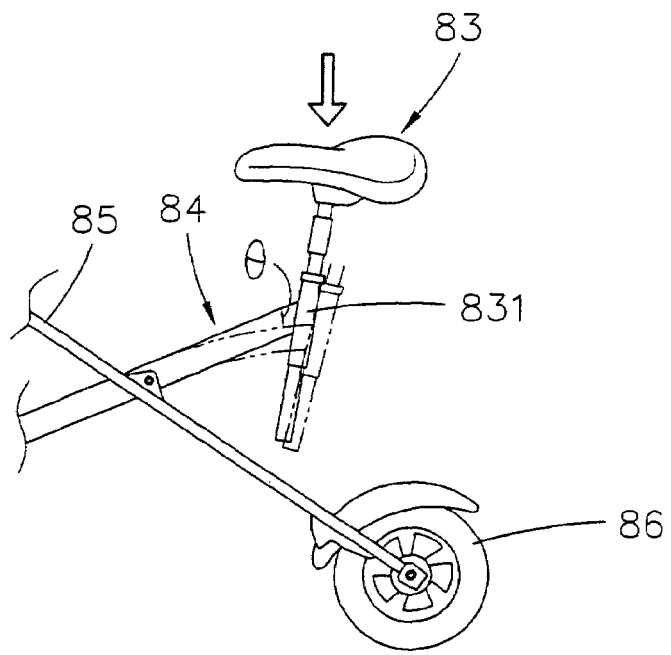
FIG. 2 is a partial view of FIG. 1 for showing a deflected angle of the first crossbar caused by sitting on the seat.
Figure 3:
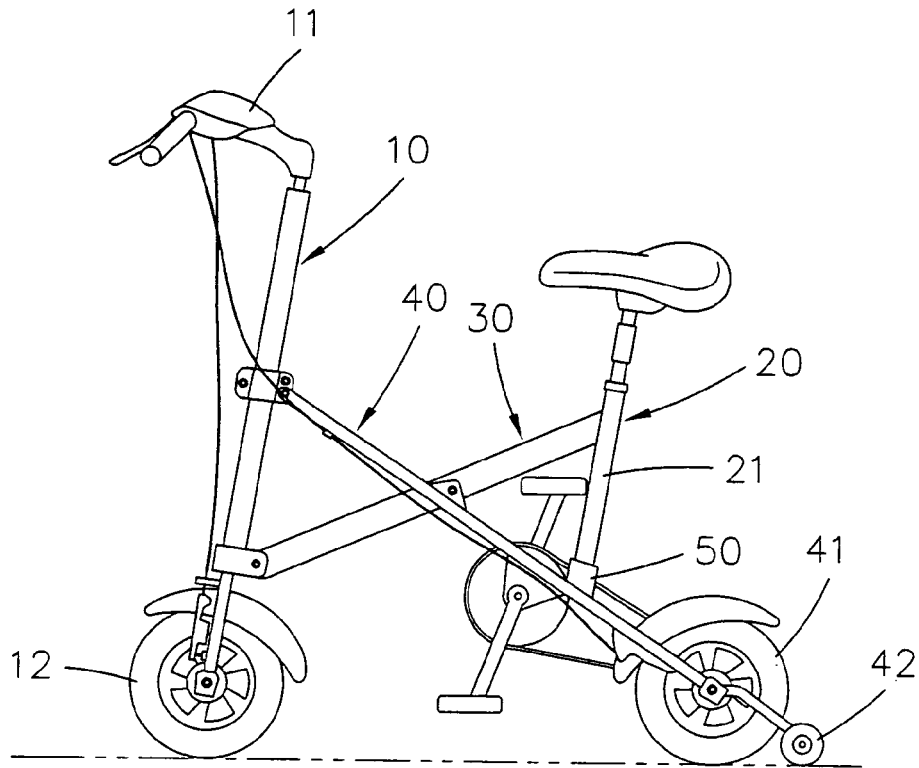
FIG. 3 is a side view of a folding bicycle according to the invention in its ready to ride state.
Figure 4:
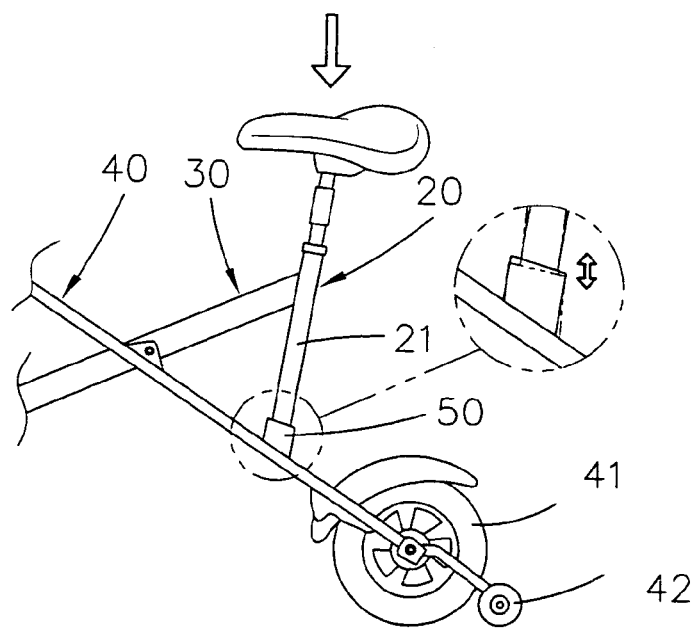
FIG. 4 is a partial view of FIG. 3 with a first preferred embodiment of shock absorbing device shown in an enlarged circle when a downward force exerted on the seat.
Figure 5:
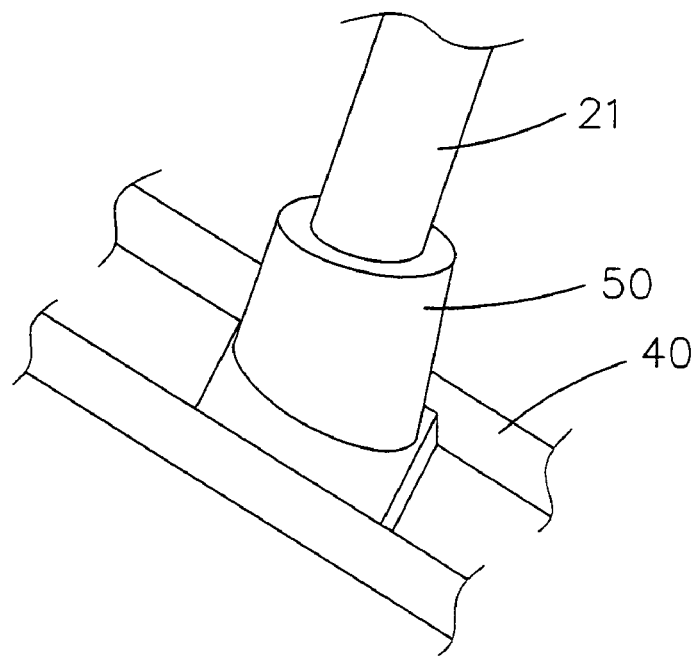
FIG. 5 is a perspective view of the shock absorbing device of FIG. 3.

Referring to FIGS. 3, 4, and 5, a folding bicycle in accordance with the invention is the shown. The bicycle comprises a handle 10 including a pair of handlebars 11 on a top, and a front wheel 12 on a bottom; a seat 20 including a seat tube 21 extended downward; a first crossbar 30 having a front end pivotably connected to a lower portion of the handle 10 proximate the front wheel 12 and a rear end fixedly connected to an intermediate portion of the seat tube 21; a pair of second crossbars 40 having two front ends pivotably connected to an intermediate portion of the handle 10 and two rear ends fixedly connected to both ends of an hub of a rear wheel 41; and a shock absorbing device 50 according to a first preferred embodiment of the invention provided at a joining portion of the seat tube 21 and the second crossbars 40 in which the first crossbar 30 passes an intermediate portion of the second crossbar 40 and is pivotably connected thereto, the shock absorbing device 50 is formed of a flexible material, and the rear wheel 41 comprises two auxiliary rear wheels 42 at both sides (see FIG. 10), each auxiliary rear wheel 42 being pivotably connected to the hub of the rear wheel 41 through a link.

As shown in FIGS. 4 and 5, the shock absorbing device 50 may elastically deform when a downward force is exerted on the seat 83, i.e., a person sits on the seat 83. Hence, the first crossbar 30 may not deflect an angle as experienced in prior art. The provision of the shock absorbing device 50 can not only absorb the force of shocks and jarring while riding but also maintain a structural strength of the bicycle.

Figure 6:
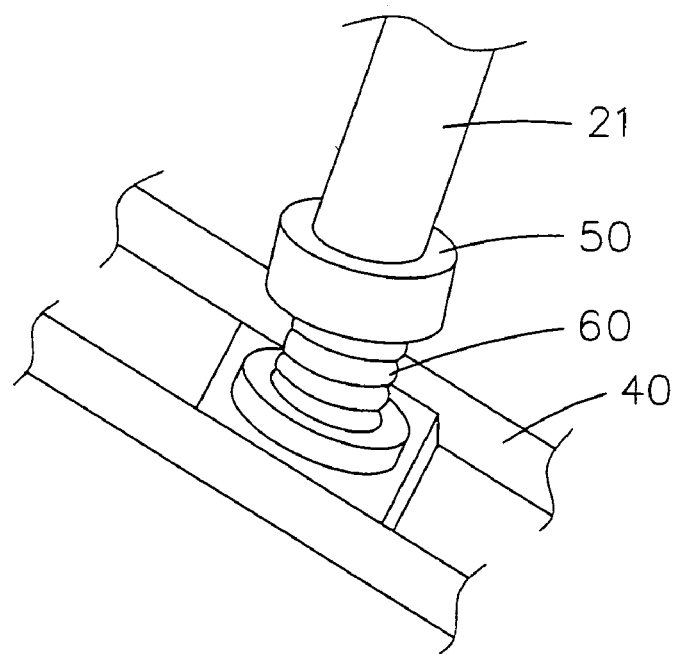
FIG. 6 is a perspective view of a second preferred embodiment of shock absorbing device.

Referring to FIG. 6, a second preferred embodiment of shock absorbing device 50 is shown. A resilient member 60 is formed between the shock absorbing device 50 and a plate interconnected the second crossbars 40.

Figure 7:
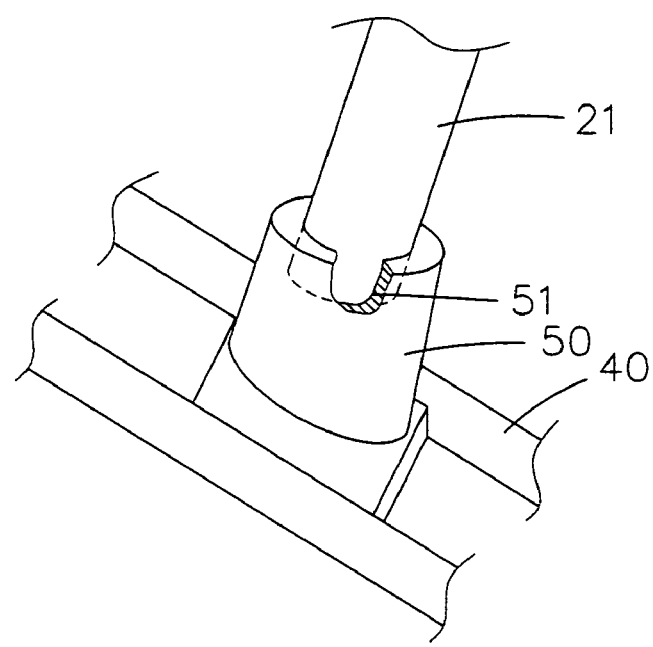
FIG. 7 is a perspective view of a third preferred embodiment of shock absorbing device.

Referring to FIG. 7, a third preferred embodiment of shock absorbing device 50 is shown. An upper cylindrical wall 51 is integrally formed with the shock absorbing device 50. A lower portion of the seat tube 21 is surrounded by the wall 51. Thus, the connection of the seat tube 21 and the shock absorbing device 50 is enhanced and reliable.

Figure 8:
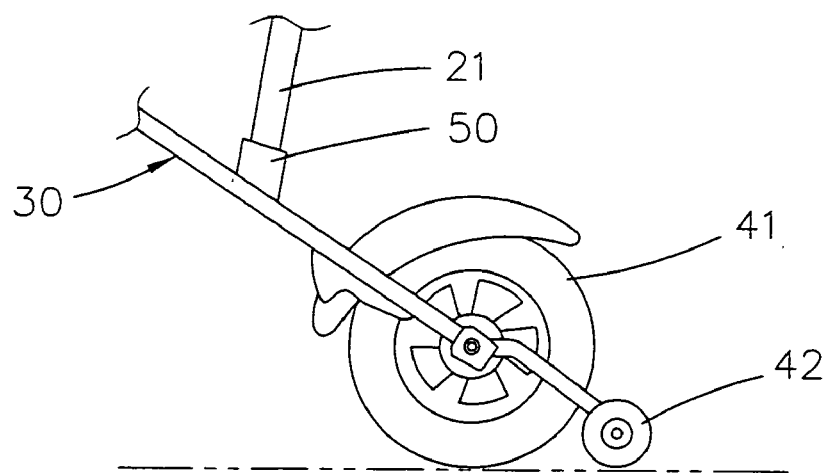
FIG. 8 is another partial view of FIG. 3 showing either auxiliary rear wheel.
Figure 9:
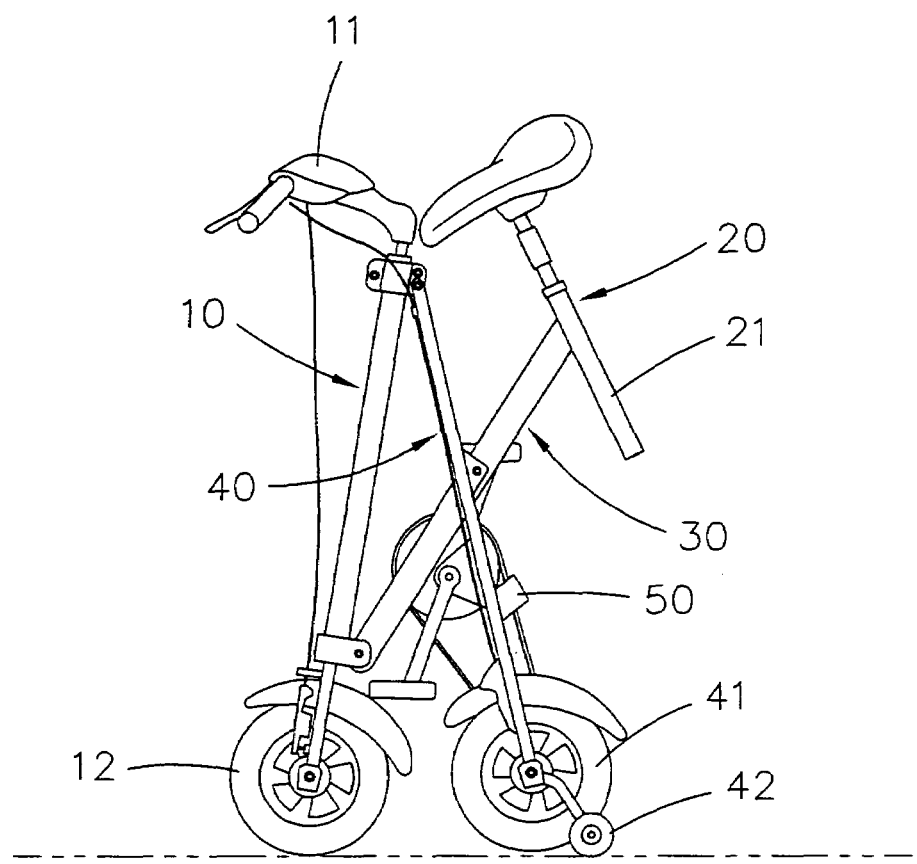
FIG. 9 is a side view of the bicycle shown in FIG. 3 in its folded state.
Figure 10:
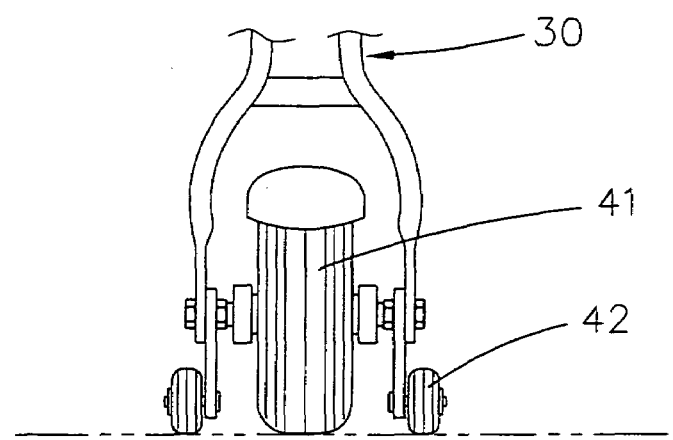
FIG. 10 is a rear view of a rear portion of the bicycle shown in FIG. 9.

Referring to FIGS. 8, 9, and 10, the auxiliary rear wheels 42 are in rotating contact with the ground. Thus, riding balance is improved. Also, a rider may push the auxiliary rear wheels 42 forward to fold the bicycle.

While the invention herein disclosed has been described by means of specific embodiments, numerous modifications and variations could be made thereto by those skilled in the art without departing from the scope and spirit of the invention set forth in the claims.

What is claimed is:

1. A folding bicycle comprising:
   a handle including a pair of handlebars on a top, and a front wheel on a bottom;
   a rear wheel including two auxiliary rear wheels at both sides, each of the auxiliary rear wheels being pivotably connected to a hub of the rear wheel through a link and being in rotating contact with the ground;
   a seat including a seat tube extended downward;
   a first crossbar having a front end pivotably connected to a lower portion of the handle above the front wheel, and a rear end fixedly connected to an intermediate portion of the seat tube;
   a pair of second crossbars having two front ends pivotably connected to an intermediate portion of the handle, and two rear ends fixedly connected to both ends of an hub of the rear wheel wherein the first crossbar passes an intermediate portion of the second crossbar and is pivotably connected thereto; and
   shock absorbing means provided at a joining portion of the seat tube and the second crossbars, the shock absorbing means being formed of a flexible material,
   wherein the shock absorbing means is adapted to elastically deform when a downward force is exerted on the seat.

2. The folding bicycle of claim 1, wherein the shock absorbing means comprises a resilient member formed between itself and the second crossbars.

3. The folding bicycle of claim 1, wherein the shock absorbing means comprises an upper cylindrical wall integrally formed therewith for surrounding a lower portion of the seat tube.

* * * * *